United States Patent [19]
Yamazaki

[11] Patent Number: 5,463,483
[45] Date of Patent: Oct. 31, 1995

[54] ELECTRO-OPTICAL DEVICE HAVING AN ANODIC OXIDE FILM

[75] Inventor: Shunpei Yamazaki, Tokyo, Japan

[73] Assignee: Semiconductor Energy Laboratory Co., Ltd., Kanagawa, Japan

[21] Appl. No.: 38,107

[22] Filed: Mar. 30, 1993

[30] Foreign Application Priority Data

Apr. 1, 1992 [JP] Japan ................................. 4-108488

[51] Int. Cl.$^6$ ............................................ G02F 1/13
[52] U.S. Cl. .................................. 359/58; 359/36; 359/54; 359/59; 359/79; 359/87
[58] Field of Search .................................. 359/59, 74, 36, 359/54, 55, 62, 79, 87, 88

[56] References Cited

U.S. PATENT DOCUMENTS 5,162,901  11/1992  Shimada et al. .......................... 359/59
5,187,602  2/1993  Ikeda et al. .............................. 359/59

*Primary Examiner*—David C. Nelms
*Assistant Examiner*—Tan Nguyen
*Attorney, Agent, or Firm*—Sixbey, Friedman, Leedom & Ferguson; Gerald J. Ferguson, Jr.; Evan R. Smith

[57] ABSTRACT

In an electro-optical device such as an active matrix liquid crystal display, an aluminum gate wiring or a wiring equivalent thereto is used as one electrode of an auxiliary capacitor, a pixel electrode is used as the other electrode, and an oxide film having high dielectric constant which is obtained by subjecting the gate wiring or the wiring equivalent thereto to an anode-oxidation treatment is used as a dielectric material of the capacitor, thereby obtaining an auxiliary (additive) capacitor having large breakdown voltage and large capacitance for stabilizing potential of the pixel electrode.

36 Claims, 5 Drawing Sheets

FIG. 4(A-1)  FIG. 4(A-2)
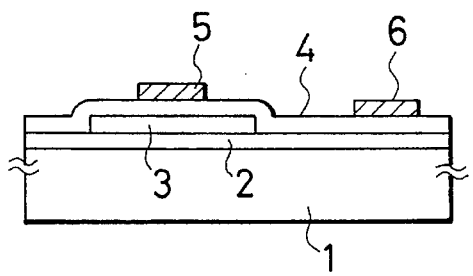 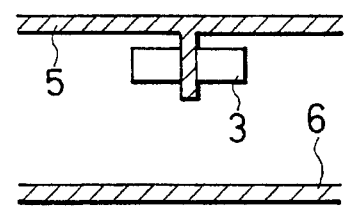
FIG. 4(B-1)  FIG. 4(B-2)
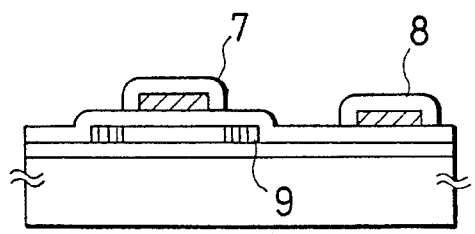 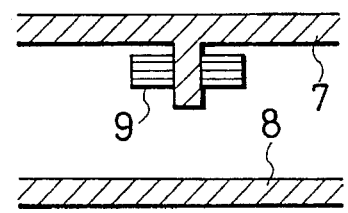
FIG. 4(C-1)  FIG. 4(C-2)
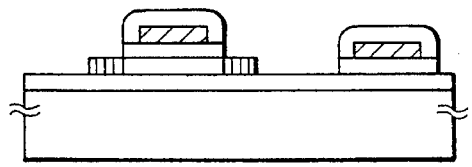 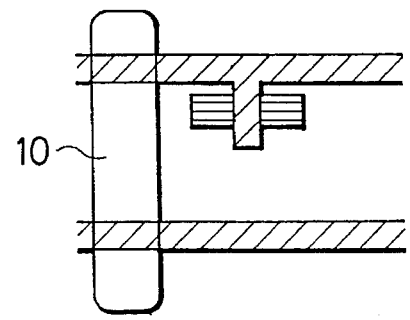
FIG. 4(D-1)  FIG. 4(D-2)
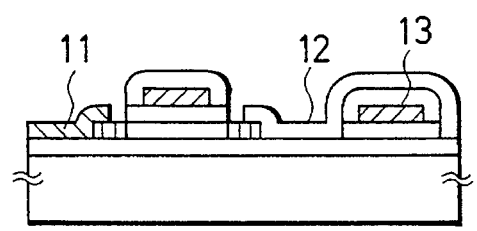 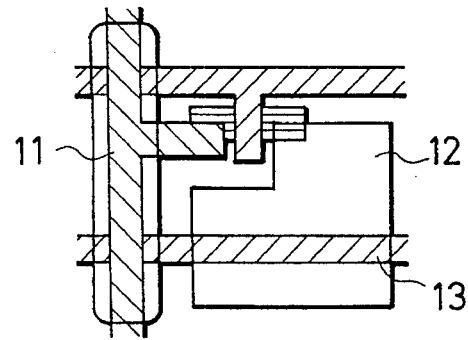

5,463,483

ELECTRO-OPTICAL DEVICE HAVING AN ANODIC OXIDE FILM

BACKGROUND OF THE INVENTION

1. Field of the Invention

This invention relates to an electro-optical device such as a liquid crystal display device, and more particularly to a display device of an active matrix.

2. Description of Prior Art

Recently an active matrix for driving a liquid crystal display has been studied intensively and used practically. In the conventional active matrix circuit, a capacitor which has liquid crystal in between pixel electrodes and counter electrodes is formed, and charges going into and out of this capacitor are controlled by a thin film transistor(TFT). For stable displaying, it was required to keep a voltage applied across both electrodes of this capacitor a constant value, but some factors made this difficult.

Most significant factor was that the charge leaked from the capacitor even while the TFT was in off state. As another factor, the charge leaking occurred also inside the capacitor, but the former leaking from the TFT was generally about 10 times as large as the latter leaking. When this leak was strong, brightness of an image was varied in the same frequency as a frame frequency, and this phenomena is called "flicker". The perturbation of the voltage ($\Delta V$) caused by capacitor coupling of a TFT gate signal and a pixel voltage due to a parasitic capacitance between them was also one of the factors.

To avoid these problems, an auxiliary capacitor (or an additive capacitor) connected in parallel to a pixel capacitor has been used. This situation is illustrated as a circuit diagram in FIG. 1(A). An equivalent circuit of FIG. 1(A) can be obtained by providing a voltage control means for controlling the voltage of an electrode of an auxiliary capacitor 100 so as to be substantially equal to a voltage of a counter electrode. Thus, a time constant of discharge of a pixel capacitance is increased by such an auxiliary capacitor. $\Delta V$ is represented as follows:

$$\Delta V = C'V_G/(C_{LC}+C'+C)$$

where $V_G$, $C_{LC}$, $C$ and $C'$ represent a gate pulse (signal voltage), a pixel capacitance, an auxiliary capacitance and a parasitic capacitance between the gate electrode and the pixel electrode, respectively. If C is larger than C' or $C_{LC}$, $\Delta V$ can be reduced. A film of silicon oxide or silicon nitride formed by CVD method has been conventionally used as dielectric material for the auxiliary capacitor.

In the film formed by CVD method, however, if the base layer of the film is rugged, a ruggedness (unevenness) on the layer has a tendency to be enhanced, and this enhancement of the unevenness raises the number of defects such as fine holes, etc. Especially to raise an aperture ratio of a display device, it is difficult to assign a large area to the auxiliary capacitor as described above. Therefore, it has been required to reduce thickness of the dielectric material or to utilize material having high dielectric constant. However, the dielectric constant of silicon oxide is small (about 4). On the other hand, the dielectric constant of silicon nitride is large (about 9), however, the film quality of silicon nitride is not good.

SUMMARY OF THE INVENTION

This invention has an object to provide a uniform film which has high breakdown voltage even if it is thin by improving the film quality of the dielectric material, and another object to utilize a film having high dielectric constant as dielectric material for an auxiliary capacitor.

In order to attain the above objects, according to the present invention, a gate wiring or a wiring equivalent thereto is formed of material which can be anode-oxidized, such as aluminum, titanium, tantalum or the like, and it is subjected to the anode-oxidation to obtain an oxide film and use it as dielectric material of an auxiliary capacitor. Thus, the film formed by the anode-oxidation is different from a film formed by a gas-phase reactive method such as a CVD method or the like, and a film formed by a physical method such as a sputtering method in that the film closely adheres to a rugged base layer. Therefore, this film has high uniformity, high density and high breakdown voltage.

The dielectric constant of oxide material obtained by subjecting aluminum, titanium, tantalum or the like to the anode-oxidization has large dielectric constant. The dielectric constant of aluminum oxide is about 9, that of tantalum oxide is about 50 and that of titanium oxide is over 80 for example. Of course, when such material whose dielectric constant is large covers wirings, a static capacitance induced between the wirings located at upper and lower sides thereof causes signal delay or signal attenuation, but this problem can be suppressed considerably by placing an inter-layer insulator having appropriate thickness therebetween. For example, even when there is provided material whose thickness is 200 nm and whose dielectric constant is 100, by forming an inter-layer insulator having 600 nm in thickness and dielectric constant of 4 on the above material and then forming an upper wiring, the capacitance can be reduce to about 1% of the capacitance in case of no-use of the inter-layer insulator. This value is only 30% larger than a value obtained by providing only an inter-layer insulator material whose thickness is 800 nm and whose dielectric constant is 4.

An electro-optical device of an active matrix in accordance with the present invention comprises:

a substrate 1;

a wiring provided on said substrate;

an anodic oxide film provided on said wiring and comprising an oxide of a material of said wiring; and a pixel electrode 17 provided on said substrate and provided in contact with said anodic oxide film.

The electro-optical device further comprises another substrate 14 provided with a counter electrode 15 thereon, and an electro-optical modulating layer 16 provided between the substrates. FIG. 5 shows the major components of the structure just described, including a pixel electrode 17 on substrate 1, a counter electrode 15 on the other substrate 14, and an electro-optical modulating layer 16 between the substrates. The wiring can be supplied with a potential. For example, the electro-optical device is provided with means for controlling a potential of the wiring to be substantially equal to a potential of the counter electrode. The wiring may function as a gate wiring of a transistor of the active matrix instead. In this case, the gate wiring is connected with a gate electrode of one transistor provided on the substrate (not the another substrate), and the pixel electrode is provided on the anodic oxide film and connected with one of source and drain of another transistor provided on the substrate (not the another substrate). In this case, the pixel electrode may be further connected with one of source and drain of said one transistor.

An electro-optical device in accordance with another aspect of the present invention comprises:

a substrate;

a gate electrode of a transistor provided on said substrate;

an anodic oxide film provided on said gate electrode and comprising an oxide of a material of said gate electrode;

a wiring provided on said substrate;

another anodic oxide film provided on said wiring and comprising an oxide of a material of said wiring;

a pixel electrode provided on said another anodic oxide film and connected with one of source and drain of said transistor;

a counter electrode provided on another substrate; and an electro-optical modulating layer provided between the substrates; and means for controlling a potential of said wiring to be substantially equal to a potential of said counter electrode.

The transistor may comprise a channel region and at least one offset region provided between the channel region and at least one of the source and drain.

An electro-optical device in accordance with a further aspect of the present invention comprises:

a substrate;

a wiring provided on said substrate and functioning as one of a pair of electrodes of a capacitor;

an anodic oxide film provided on said wiring and comprising an oxide of a material of said wiring and functioning as a dielectric of said capacitor; and a transparent conductive film provided on said anodic oxide film and functioning as a pixel electrode and the other one of said pair of electrodes.

The electro-optical device may further comprise a transistor provided on the substrate and connected with the transparent conductive film at one of source and drain of the transistor. The wiring may function as a gate wiring of another transistor provided on the substrate.

For getting an auxiliary capacitor, a method using a gate wiring of another line as its electrode and a method using an exclusive wiring formed for the auxiliary capacitor as its electrode are well known. The present invention can be applied for both methods.

Especially, in the latter case, an anode-oxidized film can be formed so as to have thickness suitable for the auxiliary capacitor. In the former case, the thickness of anode-oxidized film which covers gate wiring becomes the same as the thickness of dielectric material of the auxiliary capacitor unless a special method is used.

For example, as described in a Japanese patent application No. 4-30220 and No. 4-38637 which are inventions of the inventors of the present invention, in a case where an offset region is formed in a channel region of a TFT, an anode-oxidized film must be formed so that the thickness thereof has an appropriate value in accordance with the aim of the TFT (for driver or matrix, NMOS or PMOS). Of course, the thickness of dielectric material has the most suitable value as the auxiliary capacitor. Thus, it is required that the dielectric material has sufficient high breakdown voltage and it is thin (20–200 nm). On the other hand, in a case where an anode-oxidized film is used to form offset of the TFT, it is required that dielectric material is relatively thick (150–400 nm) in general. Therefore, these requirements are not necessarily matched with each other.

Accordingly, it is idealistic that by forming an exclusive wiring for the auxiliary capacitor and applying a current to the wiring for the optimum time, an anode-oxidized film having the most suitable thickness can be formed independently of the gate wiring. However, it is needless to say that the provision of such an exclusive wiring for the auxiliary capacitor causes reduction of an aperture ratio. Thus, the method which is considered to be best should be determined by characteristics, cost or application field of a desired display device.

Further, for example by forming a gate electrode and a gate wiring of aluminum and an auxiliary capacitor wiring of titanium, only the auxiliary capacitance can be raised. In this case, although the width of the auxiliary capacitor wiring is narrow, the capacitance is sufficient because the dielectric constant of titanium oxide is large, and consequently this improves aperture ratio. Further, for example by narrowing the width of the auxiliary capacitor wiring at a crossing of the auxiliary capacitor wiring and a data line, a parasitic capacitor between the auxiliary capacitor wiring and the data line can be also reduced.

FIG. 1. shows various active matrix circuits having auxiliary capacitors. In addition to these active matrix circuits, other active matrix circuits as disclosed in Japanese patent application No. 3-169306, No. 3-169307, No. 3-169308 and No. 3-169309, which were invented by the inventors of present invention, are also proposed.

In FIG. 1(B), an exclusive wiring for the auxiliary capacitor $X_n'$ is formed in parallel to a gate wiring $X_n$. On the other hand, in FIG. 1(C), a gate wiring of (n+1)th line is so designed as to be also used as an auxiliary capacitor of an n-th pixel line.

In FIG. 1(D), a transfer gate of CMOS is used as an active element (Japanese Laid-open patent application No. 2-178632), and in this type of circuit, since $\Delta V$ is represented as follows:

$$\Delta V = (C_1 - C_2) V_G / (C_1 + C_2 + C_{LC})$$

(where each of $C_1$ and $C_2$ includes an unintended parasitic capacitance of each TFT and pixel capacitance), therefore, $\Delta V$ can be made zero if $C_1$ and $C_2$ are equalized to each other.

In FIG. 1(E), a transfer gate of CMOS is also used as an active element. In this case, however, differently from FIG. 1(D), a gate wiring for NMOS and a gate wiring for PMOS are commonly used. In this type of circuit, $\Delta V$ is same as that of FIG. 1(D).

BRIEF DESCRIPTION OF THE DRAWINGS

FIGS. 4(A-1)–4(D-2) show an example of a fabrication process of the circuit of present invention.

DETAILED DESCRIPTION OF THE INVENTION

Preferred Embodiments according to this invention will be described hereunder with reference to the accompanying drawings.

[EMBODIMENT 1]

Figure 2A:
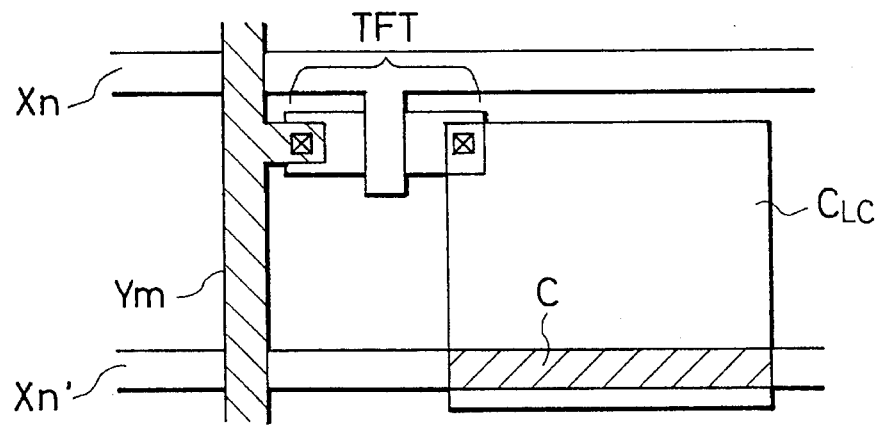
FIGS. 2(A)–2(C) show a circuit arrangement of the active matrix circuit of present invention.

FIG. 2(A) is a top view of a circuit having an auxiliary capacitor produced by this embodiment. In this figure, $X_n$ represents a gate wiring. $X_n'$ represents an exclusive wiring for the auxiliary capacitor. $Y_m$ represents a data line. $C_{LC}$ represents a pixel capacitance, and C represents an auxiliary capacitance induced at an overlap portion of $X_n$ and $C_{LC}$.

FIG. 4 shows a fabrication process of this embodiment. FIGS. 4(A-1), (B-1), (C-1) and (D-1) are cross-sectional views, and FIGS. 4(A-2), (B-2), (C-2) and (D-2) are top views. The detailed description of each process will not be hereunder described because they are described in Japanese patent application Nos. 4-30220, 4-38637 and 3-273377.

In a first step, a silicon oxide film 2 serving as a base layer was formed on a substrate 1. A multilayer of silicon oxide and silicon nitride is also available for this use. Thereafter, an islandish semiconductor region 3 was formed, an insulator film (silicon oxide) 4 was formed and then a gate wiring 5 and an auxiliary capacitor wiring 6 were formed of aluminum (as shown in FIG. 4(A-1) and (A-2)).

In the next step, aluminum oxide coating films 7 and 8 were formed around the gate wiring 5 and the auxiliary capacitor wiring 6 by an anode-oxidization treatment. By independently controlling respective currents to be supplied to the gate wiring 5 and the auxiliary capacitor wiring 6, the anode-oxidized film was formed so that its thickness was 350 nm for the former and 150 nm for the latter. Alternately, by carrying out a two-step anode-oxidization treatment, the thickness of the oxide film can be controlled as described in Japanese patent application No. 4-30220 or No. 4-38637. Further, an impurity doping was carried out to form an impurity region (source/drain) 9 (as shown in FIGS. 4(B-1) and (B-2)).

Subsequently, an inter-layer insulator of silicon oxide was formed in 500 nm thickness. Silicon oxide 10 over all portions except for a portion under the data line was removed ( as shown in FIGS. 4(C-1) and (C-2)).

At the region where data line and gate line or auxiliary capacitor wiring crosses each other, a capacitance is induced and this capacitance causes a gate signal or data to be delayed. In order to reduce this capacitance, it is effective to form the inter-layer insulator thickly, but at other regions the inter-layer insulator is not specially necessary. Especially in a case of removing even a silicon oxide layer formed as a gate insulator film like this embodiment, a contact hole in conventional device is not required, so that contact failure could be reduced remarkably.

In such a process, a mask is required at a silicon oxide region 10, however, at other regions a mask is not specially required. This is because aluminum oxide formed as an anode-oxidized film has great durability, and for example in an etching treatment using buffered hydrofluoric acid, an etching rate of aluminum oxide is sufficiently slow than that of silicon oxide.

Thus, the silicon oxide film in the gate electrode region can be etched in self-alignment. Conventionally, a fine mask setting for formation of a contact hole of TFT has been required. However, in this embodiment, it is not required. Of course, silicon oxide formed on the auxiliary wiring is also removed and thus the anode-oxidized film is exposed.

In the final step, a data line 11 was formed of aluminum or chromium as an upper wiring. The silicon oxide interlayer insulator remains under the data line 11 on the aluminum oxide coating films (anodic oxide films). The upper wiring is crossed with the lower wiring 6 .with the anodic oxide film 8 and the interlayer insulator therebetween. The upper wiring is connected with source or drain 9 as shown in FIG. 4(D-1). A pixel electrode 12 was formed by ITO. At this time, by disposing the pixel electrode and the exclusive wiring for the auxiliary capacitor so as to be superimposed on each other, the auxiliary capacitor 13 could be made (as shown in FIGS. 4(D-1)and (D-2)). Of course, aluminum (or chromium) electrode and wiring may be also formed at the pixel electrode side of the TFT and the pixel electrode of ITO may be formed thereon.

[EMBODIMENT 2]

Figure 2B:
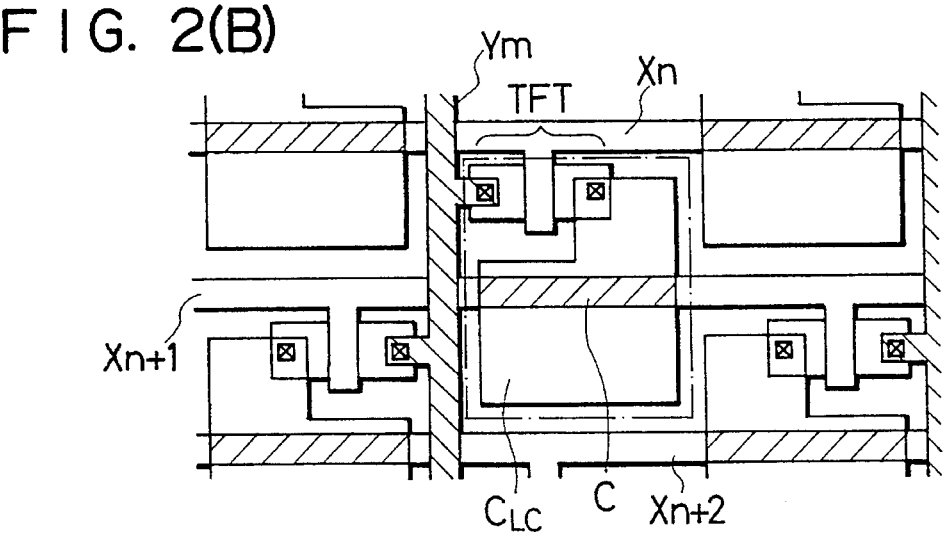

A matrix circuit having an auxiliary circuit as shown in FIG. 2(B) was fabricated by the same process as the embodiment 1. In this embodiment, differently from the embodiment 1, a gate wiring also works as an electrode of a pixel capacitor of an upper line (row) thereof. In this embodiment, the thickness of the anode-oxidized film on the gate wiring (which is also a wiring of the auxiliary capacitor) was set to 200 nm.

Especially in a case like this embodiment, an alternate arrangement of the TFTs as shown in FIG. 2(B) was effective to save the distance between wirings and thus improve an aperture ratio. Thus, in this embodiment, neighboring TFTs in the same column were placed such that the lower TFT was placed at a left side of a data line when the upper TFT was placed at a right side of the data line.

[EMBODIMENT 3]

Figure 1A:
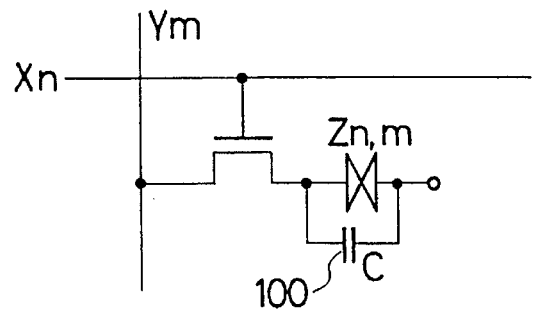
FIGS. 1(A)–1(E) are a diagram of an active matrix circuit of present invention.
Figure 1B:
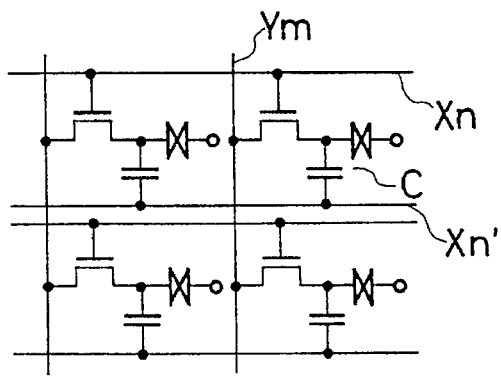
Figure 1C:
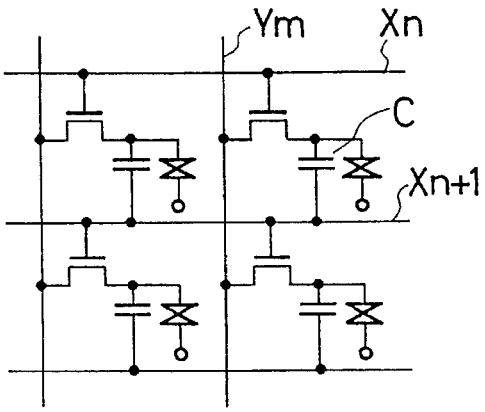
Figure 1D:
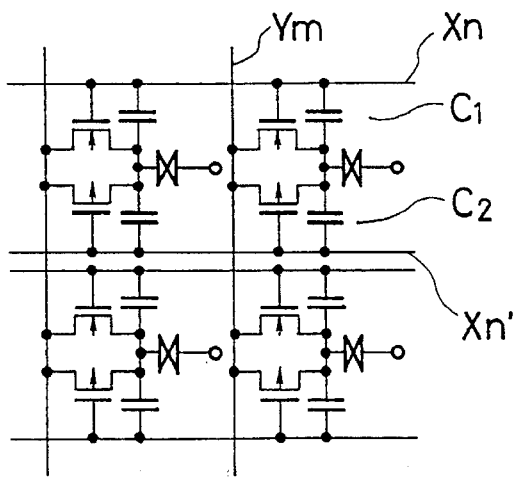
Figure 2C:
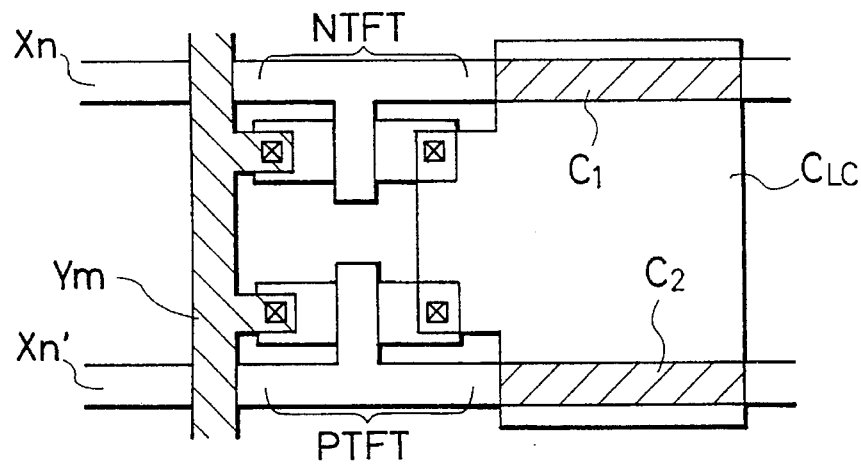

A matrix circuit having an auxiliary circuit as shown in FIG. 2(C) was fabricated by the same process as the embodiment 1. This circuit was the same as the circuit as shown in FIG. 1(D). That is, a pixel electrode $C_{LC}$ was formed so as to cover the gate wiring $X_n$ of NMOS and the gate wiring $X_n'$ of PMOS for driving a transfer gate of CMOS, and auxiliary capacitor C1 and C2 were formed.

In such a circuit, as is apparent from the expression of ΔV as described above, special attention must be paid to the width of gate wiring and the capacitance of the pixel electrode because ΔV is induced and the pixel potential suffers strong fluctuation if $C_1$ and $C_2$ are not equal to each other.

[EMBODIMENT 4]

Figure 1E:
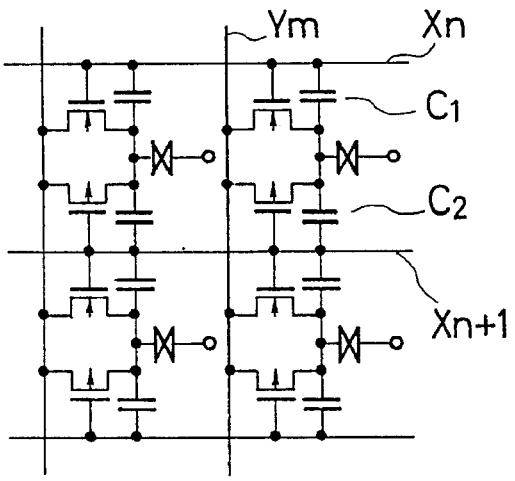
Figure 3A:
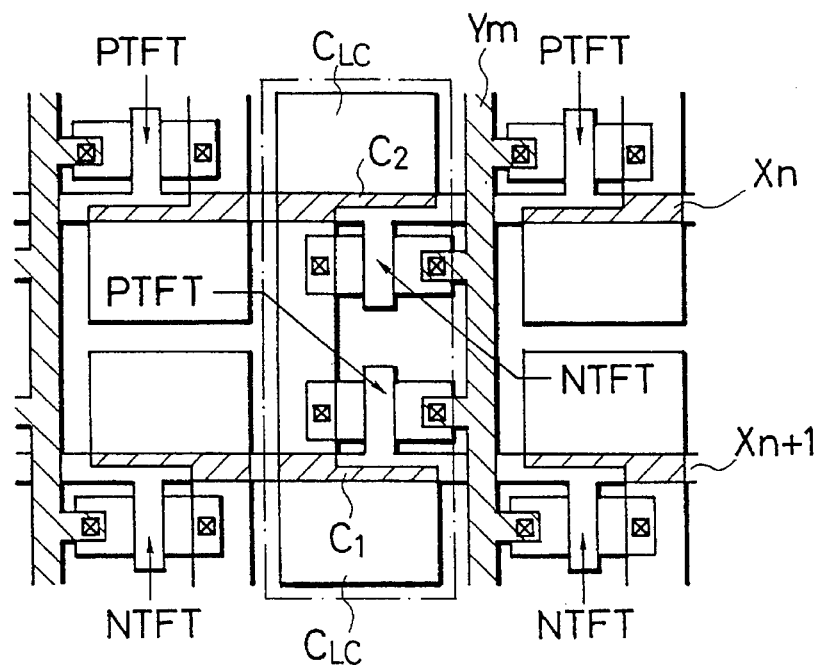
FIGS. 3(A)–3(B) show a circuit arrangement of the active matrix circuit of present invention.

A matrix circuit having an auxiliary circuit as shown in FIG. 3(A) was fabricated by the same process as the embodiment 1. This circuit was the same as the circuit as shown in FIG. 1(E). A pixel electrode $C_{LC}$ was formed so as to cover the gate wiring $X_n$ of an n-th line and the gate wiring $X_{n+1}$ of (n+1)-th line for driving a transfer gate of CMOS, and the auxiliary capacitor $C_1$ and $C_2$ were formed.

In such a circuit, as is apparent from the expression of ΔV as described above, a special attention must be also paid to the width of the gate wiring and the capacitance of the pixel electrode because ΔV is induced and the pixel potential has strong fluctuation if $C_1$ and $C_2$ are not equal to each other.

In the case like this embodiment, the alternate arrangement of the transfer gate circuits was effective for saving the distance between the wirings and thus improving an aperture ratio as shown in FIG. 3(A). Thus, in this embodiment, the neighboring transfer gate circuits on the same line were placed such that the lower transfer circuit was placed at a left side of a data line when the upper transfer circuit was placed at a right side of the data line.

[EMBODIMENT 5]

Figure 3B:
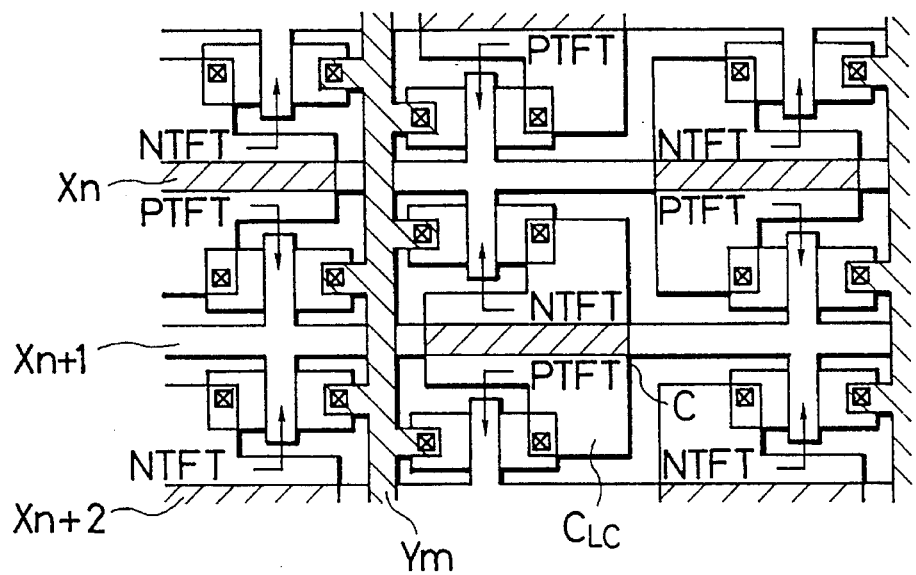
Figure 5:
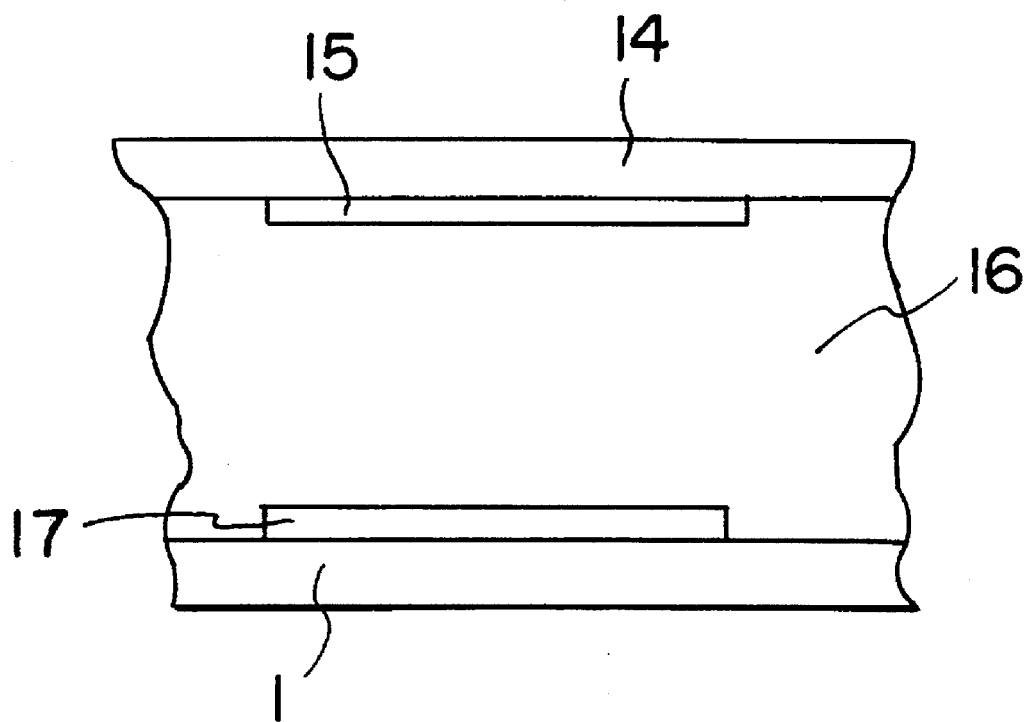
FIG. 5 is a side view of an electro-optical device according to the present invention with a pixel electrode, counter electrode, and electro-optical modulating layer, all located between two substrates.

A matrix circuit having an auxiliary circuit as shown in FIG. 3(B) was fabricated by the same process as the embodiment 1. This circuit was the same as the circuit as shown in FIG. 1(E) except for the auxiliary capacitor, and a pixel electrode $C_{LC}$ was formed so as to cover a gate wiring which had no relation to the concerned pixel, and the auxiliary capacitor C was formed.

Thus, paying an attention to an m-th column, an NMOS was placed at the n-th line and a PMOS was placed at the (n+2)-th line to form the transfer gate circuit, and the pixel electrode was formed on the anode-oxidized film of the gate wiring $X_{n+1}$ on the (n+1)-th line to form the auxiliary capacitor C.

In such a circuit, unlike the embodiments 3 and 4, if a parasitic capacitance of each TFT was very small, the auxiliary capacitor of each TFT does not work as a parasitic capacitor, so that apparently from the expression as described above, it can be considered to be substantially zero.

In this embodiment, the alternate arrangement of the transfer gate circuits was also effective to save the distance between the wirings and thus improve the aperture ratio as shown in FIG. 3(B).

As described above, according to this invention, a high-reliable auxiliary capacitor to stabilize a pixel voltage could be formed. In this embodiment, a planer type TFT was representatively described, however, it is apparent that the same effect can be also obtained in an inverse-stagger type TFT which is frequently used in present amorphous silicon TFT.

What is claimed is:

1. An electro-optical device having an active matrix, comprising:

a substrate;

a wiring provided on said substrate;

an anodic oxide film provided on said wiring and comprising an oxide of a material of said wiring; and a pixel electrode provided on said substrate and provided in contact with said anodic oxide film, wherein said active matrix comprises at least one top gate transistor and said wiring functions as a gate wiring of said top gate transistor of said active matrix.

2. The device of claim 1 further comprising:

a second substrate provided with a counter electrode thereon;

an electro-optical modulating layer provided between the substrate and the second substrate; and means for controlling a potential of said wiring to be substantially equal to a potential of said counter electrode.

3. The device of claim 2 wherein said anodic oxide film has a thickness of 20 to 200 nm.

4. The device of claim 1 wherein said wiring comprises a material selected from the group consisting of aluminum, titanium, and tantalum.

5. An electro-optical device comprising:

a first substrate;

a transistor having a source and drain;

a gate electrode of said transistor provided on said substrate;

an anodic oxide film provided on said gate electrode and comprising an oxide of a material of said gate electrode;

a wiring provided on said substrate;

another anodic oxide film provided on said wiring and comprising an oxide of a material of said wiring;

a pixel electrode provided on said another anodic oxide film and connected with one of said source and drain of said transistor;

a counter electrode provided on a second substrate;

an electro-optical modulating layer provided between the first and second substrates; and means for controlling a potential of said wiring to be substantially equal to a potential of said counter electrode.

6. The device of claim 5 wherein said transistor comprises a channel region and at least one offset region provided between said channel region and at least one of said source and drain.

7. The device of claim 6 wherein said gate electrode comprises aluminum, and said wiring comprises titanium.

8. The device of claim 5 wherein said another anodic oxide film has a thickness of 20 to 200 nm.

9. The device of claim 5 further comprising:

an interlayer insulator provided on said another anodic oxide film with said wiring as a lower wiring; and an upper wiring crossed with said lower wiring with said another anodic oxide film and said interlayer insulator therebetween.

10. The device of claim 9 wherein said upper wiring is connected with the other one of the source and drain of said transistor.

11. An electro-optical device comprising:

a substrate;

a gate wiring provided on said substrate and connected with a gate electrode of one transistor provided on said substrate;

an anodic oxide film provided on said gate wiring and comprising an oxide of a material of said gate wiring; and a pixel electrode provided with said anodic oxide film between said gate wiring and said pixel electrode, said pixel electrode being connected with one of a source and drain of another transistor provided on said substrate.

12. The device of claim 11 wherein said pixel electrode is connected with one of source and drain of said one transistor.

13. An electro-optical device comprising:

a substrate;

a wiring provided on said substrate and functioning as one of a pair of electrodes of a capacitor;

an anodic oxide film provided on said wiring and comprising an oxide of a material of said wiring and functioning as a dielectric of said capacitor;

a transparent conductive film provided with said anodic oxide film between said wiring and said transparent conductive film, said transparent conductive film functioning as a pixel electrode and the other one of said pair of electrodes; and a top gate transistor provided on said substrate and connected with said transparent conductive film at one of source and drain of said top gate transistor.

14. The device of claim 13 further comprising a second transistor provided on said substrate, wherein said wiring functions as a gate wiring of said second transistor.

15. The device of claim 13 further comprising:

a second substrate provided with a counter electrode thereon;

an electro-optical modulating layer provided between the substrate and the second substrate; and means for controlling a potential of said wiring to be substantially equal to a potential of said counter electrode.

16. The device of claim 15 wherein said anodic oxide film has a thickness of 20 to 200 nm.

17. An electro-optical device comprising:

a top gate transistor comprising a gate electrode provided on a substrate, the top gate transistor further comprising an anodic oxide provided around the gate electrode;

a capacitor comprising a wiring provided on the substrate, a pixel electrode, and an anodic oxide of a material of the wiring provided between the wiring and the pixel electrode, wherein the material of the wiring is the same as a material of the gate electrode.

18. The device of claim 17 wherein the material of the gate electrode is selected from the group consisting of aluminum, titanium and tantalum.

19. The device of claim 12 wherein the top gate transistor further comprises a channel provided between the substrate and the gate electrode.

20. An electro-optical device comprising:

a gate wiring provided on a substrate;

a top gate transistor provided on the substrate and comprising a source, a drain and a gate electrode, the gate electrode being connected with the gate wiring; and a capacitor provided on the substrate and comprising a pair of electrodes and an anodic oxide of a material of one of the pair of electrodes, the anodic oxide being provided between the pair of electrodes, and the other of the pair of electrodes serving as a pixel electrode and being connected with one of the source and the drain, wherein the material of the one of the pair of electrodes is the same as a material of the gate electrode.

21. An electro-optical device comprising:

a first transistor provided on a substrate and comprising a first source, a first drain and a first gate electrode;

a second transistor provided on the substrate and comprising a second source, a second drain and a second gate electrode;

a first wiring provided on the substrate and connected with the first gate electrode;

a second wiring provided on the substrate and connected with the second gate electrode;

an anodic oxide of a material of the second wiring; and a pixel electrode connected with one of the first source and the first drain and provided on the substrate with the anodic oxide between the second wiring and the pixel electrode, the pixel electrode and the anodic oxide and the second wiring constituting a capacitor, wherein the material of the second wiring is the same as a material of the first wiring.

22. The device of claim 21 further comprising a third wiring connected with the other of the first source and the first drain and one of the second source and the second drain.

23. The device of claim 21 wherein the first transistor and the second transistor are top gate transistors.

24. An electro-optical device comprising:

a first transistor provided on a substrate and comprising a first source, a first drain and a first gate electrode;

a second transistor provided on the substrate and comprising a second source, a second drain and a second gate electrode;

a first wiring provided on the substrate and connected with the first gate electrode;

a second wiring provided on the substrate and connected with the second gate electrode;

a first anodic oxide of a material of the first wiring;

a second anodic oxide of a material of the second wiring; and a pixel electrode connected with one of the first source and the first drain and one of the second source and the second drain, wherein the first anodic oxide is provided between the first wiring and the pixel electrode to constitute a first capacitor, and the second anodic oxide is provided between the second wiring and the pixel electrode to constitute a second capacitor.

25. The device of claim 24 wherein the material of the first wiring is the same as the material of the second wiring.

26. The device of claim 24 further comprising a third wiring connected with the other of the first source and the first drain and the other of the second source and the second drain.

27. The device of claim 24 wherein the first transistor and the second transistor are top gate transistors.

28. The device of claim 24 wherein the first transistor is a p-type transistor and the second transistor is an n-type transistor.

29. An electro-optical device comprising:

a first transistor provided on a substrate and comprising a first source, a first drain and a first gate electrode;

a second transistor provided on the substrate and comprising a second source, a second drain and a second gate electrode;

a first wiring provided on the substrate and connected with the first gate electrode;

a second wiring provided on the substrate and connected with the second gate electrode;

a first anodic oxide of a material of the first wiring;

a second anodic oxide of a material of the second wiring; and a pixel electrode connected with one of the first source and the first drain and one of the second source and the second drain, wherein the first anodic oxide is provided between the first wiring and the pixel electrode to constitute a first capacitor, and the second anodic oxide is provided between the second wiring and the pixel electrode to constitute a second capacitor.

30. The device of claim 29 further comprising a third wiring connected with the other of the first source and the first drain and the other of the second source and the second drain.

31. The device of claim 29 wherein the material of the first wiring is the same as the material of the second wiring.

32. The device of claim 29 wherein the first transistor and the second transistor are top gate transistors.

33. An electro-optical device comprising:

a first transistor provided on a substrate and comprising a first source, a first drain and a first gate electrode.

a second transistor provided on the substrate and comprising a second source, a second drain and a second gate electrode;

a third transistor provided on the substrate and comprising a third source, a third drain and a third gate electrode;

a fourth transistor provided on the substrate and comprising a fourth source, a fourth drain and a fourth gate electrode;

a wiring provided on the substrate and connected with the third gate electrode and the fourth gate electrode;

an anodic oxide of a material of the wiring; and a pixel electrode provided on the substrate and connected with one of the first source and the first drain and one of the second source and the second drain, wherein the anodic oxide is provided between the wiring and the pixel electrode to constitute a capacitor.

34. The device of claim 33 further comprising a wiring connected with the other of the first source and the first drain, the other of the second source and the second drain, one of the third source and the third drain, and one of the fourth source and the fourth drain.

35. The device of claim 33 wherein the first transistor, the second transistor, the third transistor and the fourth transistor are top gate transistors.

36. The device of claim 33 wherein the first transistor is a p-type transistor and the second transistor is an n-type transistor.

* * * * *